(12) United States Patent
Vukovich et al.

(10) Patent No.: US 6,634,866 B2
(45) Date of Patent: Oct. 21, 2003

(54) METHOD AND APPARATUS FOR PROVIDING A HYDRAULIC TRANSMISSION PUMP ASSEMBLY HAVING A ONE WAY CLUTCH

(75) Inventors: William Vukovich, White Lake Township, MI (US); Mark R. Buchanan, Rochester Hills, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 209 days.

(21) Appl. No.: 09/932,212

(22) Filed: Aug. 17, 2001

(65) Prior Publication Data

US 2003/0035734 A1 Feb. 20, 2003

(51) Int. Cl.$^7$ ................................................ F04B 49/00
(52) U.S. Cl. .................................................... 417/223
(58) Field of Search ...................... 417/223, 15, 44.1, 417/44.2, 280, 319, 364, 362

(56) References Cited

U.S. PATENT DOCUMENTS

| 2,551,939 A | 5/1951 | Gerst |
| 2,687,198 A | 8/1954 | Greenlee |
| 2,712,373 A | 7/1955 | Smirl |

(List continued on next page.)

FOREIGN PATENT DOCUMENTS

| DE | 871 857 | 3/1953 |
| DE | 31 18 565 A1 | 11/1982 |
| DE | 31 49 880 C2 | 7/1985 |
| DE | 35 26 630 A1 | 2/1987 |
| DE | 35 32 759 C1 | 3/1987 |
| DE | 40 35 686 C1 | 1/1992 |
| DE | 91 14 528.7 | 3/1992 |
| DE | 43 32 466 C2 | 2/1998 |
| DE | 195 02 617 C2 | 9/1998 |
| DE | 199 06 980.8 | 2/1999 |
| EP | 0 172 006 | 2/1986 |
| EP | 0 762 009 A1 | 3/1997 |
| EP | 0 848 179 A1 | 6/1998 |
| FR | 1.575.044 | 7/1969 |
| FR | 2.123.828 | 9/1972 |
| GB | 2 036 203 | 6/1980 |
| WO | WO 97/32678 | 9/1997 |
| WO | WO 99/45289 | 9/1999 |

OTHER PUBLICATIONS

"Der neue Ford 2, 3–1–Motor mit Ausgleichswellen," Georg Heuser, Stefan Huegen, Andreas Brohmer, Glenn A. Warren and Rudolf J. Menne; Motortechnische Zeitschrift Jan. 1997, pp. 10–14.

"Das Porshe–Doppelkupplungs–(PDK–) Getriebe,"(The Porsche Dual Clutch Transmission), Helmut Flegl, Rainer Wuest, Norbert Stelter, and Imre Szodfridt; Automobiltechnicshe Zeitschrift 89 (1987) 9, pp. 439–452.

"The Two–Mass Flywheel—A Torsional Vibration Damper for the Power Train of Passanger Cars—State of the Art and Further Technical Development," Arno Sebulke; Bayerische Motoren Werke AG (BMW), Feb. 1987, pp. 1–10.

Primary Examiner—Teresa Walberg
Assistant Examiner—Vinod D. Patel
(74) Attorney, Agent, or Firm—Bliss McGlynn, P.C.; Greg Dziegielewski

(57) ABSTRACT

A hydraulic transmission pump assembly adapted to provide fluid under pressure to predetermined components in a transmission including a one-way clutch assembly operatively coupled to the pump and an electric motor operatively coupled to the one-way clutch. The one-way clutch is operatively connected to an engine to provide motive power the pump and the electric motor at engine speeds above a predetermined level thereby providing fluid under pressure to the transmission and driving the electric motor to generate electricity. The electric motor is operable to drive the pump at engine speeds below the predetermined level to provide fluid under pressure to the transmission during this operating condition.

20 Claims, 2 Drawing Sheets

U.S. PATENT DOCUMENTS

| | | |
|---|---|---|
| 3,047,115 A | 7/1962 | Lee et al. |
| 3,394,631 A | 7/1968 | Thompson |
| 3,490,312 A | 1/1970 | Seitz et al. |
| 3,534,842 A | 10/1970 | Davison, Jr. |
| 3,589,483 A | 6/1971 | Smith |
| 3,596,537 A | 8/1971 | Koivunen |
| 3,610,380 A | 10/1971 | Montalvo, III |
| 3,612,237 A | 10/1971 | Honda |
| 3,654,692 A | 4/1972 | Goetz |
| 3,765,519 A | 10/1973 | Kell |
| 3,834,503 A | 9/1974 | Maurer et al. |
| 3,848,518 A | 11/1974 | Martin |
| 4,205,739 A | 6/1980 | Shelby et al. |
| 4,219,246 A | 8/1980 | Ladin |
| 4,270,647 A | 6/1981 | Leber |
| 4,301,904 A | 11/1981 | Ahlen |
| 4,361,217 A | 11/1982 | Bieber et al. |
| 4,372,434 A | 2/1983 | Aschauer |
| 4,501,676 A | 2/1985 | Moorhouse |
| 4,540,347 A | 9/1985 | Child |
| 4,640,478 A | 2/1987 | Leigh-Monstevens |
| 4,667,534 A | 5/1987 | Kataoka |
| 4,667,798 A | 5/1987 | Sailer et al. |
| 4,700,823 A | 10/1987 | Winckler |
| 4,732,253 A | 3/1988 | Hiramatsu et al. |
| 4,733,762 A | 3/1988 | Gay et al. |
| 4,747,744 A | 5/1988 | Dominique et al. |
| 4,808,015 A | 2/1989 | Babcock |
| 4,813,524 A | 3/1989 | Reik |
| 4,827,784 A | 5/1989 | Muller |
| 4,856,635 A | 8/1989 | Vlamakis |
| 4,976,594 A | 12/1990 | Bernstrom |
| 5,152,726 A | 10/1992 | Lederman |
| 5,174,420 A | 12/1992 | DeWald et al. |
| 5,261,803 A | 11/1993 | Freeman |
| 5,267,807 A | 12/1993 | Biedermann et al. |
| 5,305,863 A | 4/1994 | Gooch et al. |
| 5,395,217 A | 3/1995 | Hoffmann et al. |
| 5,423,405 A | 6/1995 | Fukaya |
| 5,466,195 A | 11/1995 | Nogle et al. |
| 5,469,943 A | 11/1995 | Hill et al. |
| 5,476,374 A | 12/1995 | Langreck |
| 5,495,927 A | 3/1996 | Samie et al. |
| 5,538,121 A | 7/1996 | Hering |
| 5,554,019 A | 9/1996 | Hodge |
| 5,577,588 A | 11/1996 | Raszkowski |
| 5,613,588 A | 3/1997 | Vu |
| 5,653,322 A | 8/1997 | Vasa et al. |
| 5,662,198 A | 9/1997 | Kojima et al. |
| 5,711,409 A | 1/1998 | Murata |
| 5,755,314 A | 5/1998 | Kanda et al. |
| 5,899,310 A | 5/1999 | Mizuta |
| 5,918,715 A | 7/1999 | Ruth et al. |
| 6,244,407 B1 | 6/2001 | Kremer et al. |
| 6,258,001 B1 * | 7/2001 | Wakuta et al. ............ 475/5 |
| 6,340,339 B1 * | 1/2002 | Tabata et al. ............. 475/5 |
| 6,554,113 B2 * | 4/2003 | Li et al. |

* cited by examiner

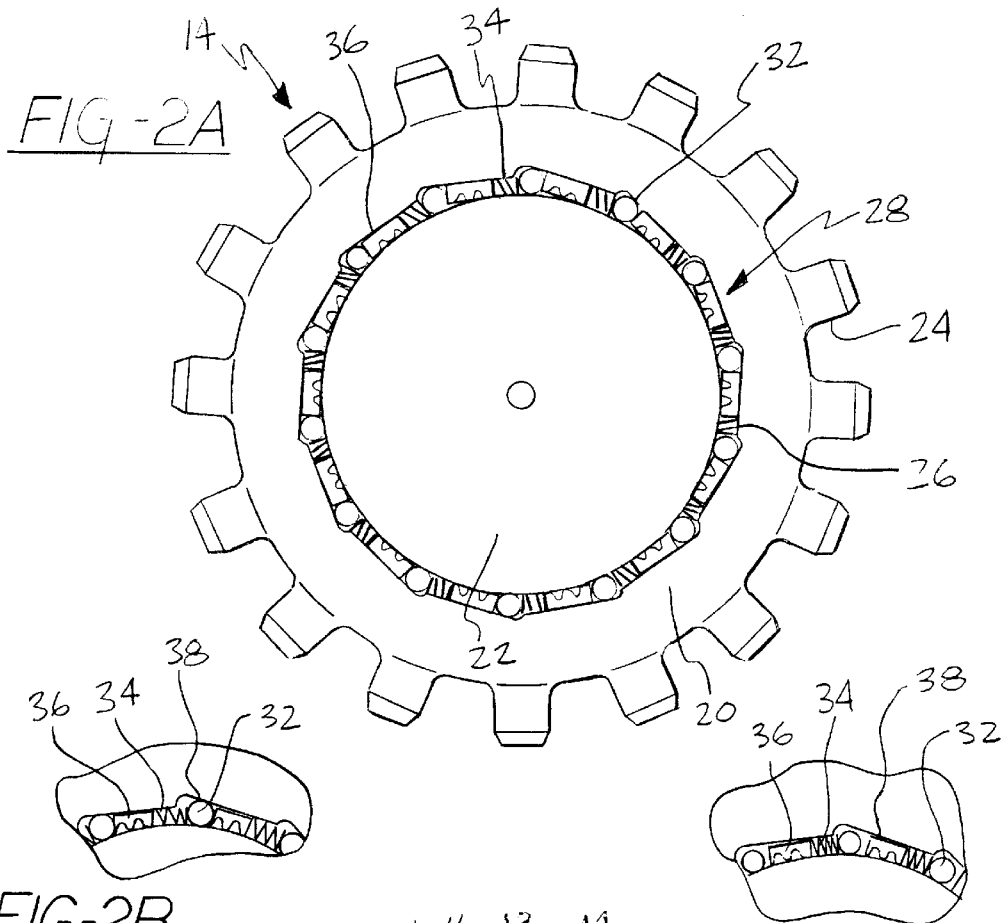
FIG-2A
FIG-2B
FIG-2C
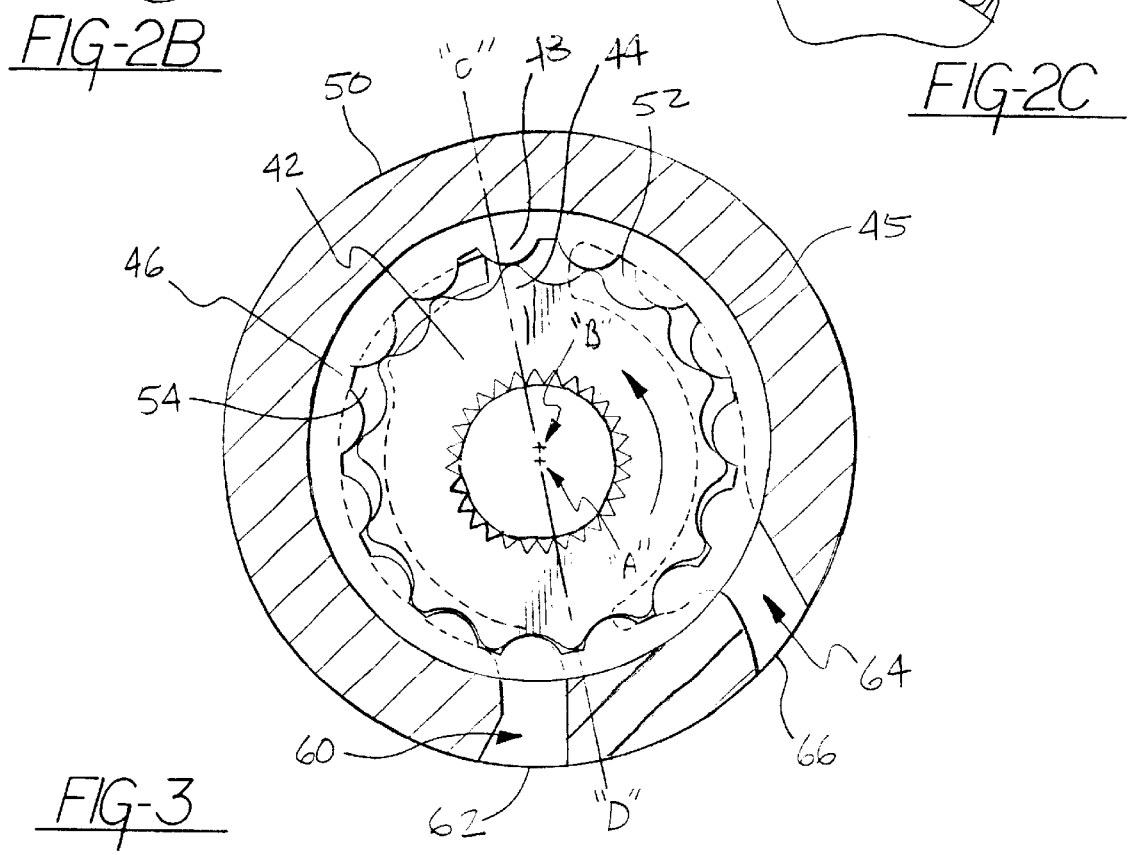
FIG-3

METHOD AND APPARATUS FOR PROVIDING A HYDRAULIC TRANSMISSION PUMP ASSEMBLY HAVING A ONE WAY CLUTCH

FIELD OF THE INVENTION

The present invention relates generally to a hydraulic transmission pump assembly and, more specifically, to a method and apparatus for providing a hydraulic transmission pump assembly having a one-way clutch that is capable of providing the hydraulic power to a vehicle transmission.

DESCRIPTION OF THE RELATED ART

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle.

Transmissions generally include one or more gear sets. One type of gear set commonly employed in automatic transmissions is a planetary gear set, named for the relative rotation of the "planet gears" that each rotate on their individual axis while revolving around a "sun gear". Planetary gear sets are made up of three components, all in constant mesh; a sun gear, a planetary carrier with planet gears, and a surrounding ring gear or internal gear. When one component is held stationary, and another component is rotated, the third component is driven at either a reduction, or an increase in speed, or a rotation in the opposite direction. The planetary gear sets that are commonly used in today's automatic transmissions are actually "compound planetary gear sets" because they are basically two planetary sets that have common parts. Most 3-speed transmissions, for example, use two ring gears, two planetary carriers, and a common sun gear that is axially long enough to mesh with both planetary carriers. By changing which components are rotated by the engine, and which components are "held", two different gear reductions (1st gear, and 2nd gear) and reverse, as well as a 1:1 ratio (third gear) can be obtained. Thus transmissions typically include a plurality of clutch or brake assemblies that are employed as holding mechanisms in the transmission.

One example of a device used as a "holding" mechanism in a transmission is a one-way clutch. One-way clutches have inner and outer races that allow free relative rotation of the two races in one direction but lock together in the opposite rotational direction. In application, when the races are fixed on concentric shafts, the shafts will be held together in one rotational direction, and be able to freewheel in the other rotational direction.

Multi-disk pack friction clutches are another example of a clutch assembly that is commonly employed for this purpose in a transmission. The multi-disk pack friction clutch or brake assembly usually employs a clutch subassembly including a set of plates and a set of friction disks that are interleaved between one another. The plates and friction disks are bathed in a continual flow of lubricant. The clutch or brake assembly also typically includes an actuating piston. When a component of a gear set is to be held, as for example during a particular gear change, a piston is actuated so as to cause the plates and friction disks to come into contact with respect to one another. In certain applications, it is known to employ several one-way clutches or multi-disk pack friction devices in combination to establish different drive connections throughout the transmission to provide various gear ratios in operation, or to brake a component. Thus, it is necessary to provide lubrication to the gear sets and the holding and shifting devices within the transmission in order to ensure their smooth and efficient operation while avoiding undue wear. Additionally, the lubrication functions to remove excess heat and cool the internal components of the transmission to within acceptable designed operating temperatures.

Within the transmission, the multi-disk friction clutches, brake systems, and gear sets have traditionally relied on a continuous "splash" supply of coolant, typically an oil, known generally as automatic transmission fluid (ATF), to remove the heat generated during operation and lubricate various moving parts. To this end, the transmission typically includes a hydraulic pump that provides ATF under pressure to supply various components with the fluid pressure necessary to actuate, lubricate and cool such components. The transmission pump is powered by the vehicle's engine through some manner of connection with an input shaft or power input. The pump draws ATF from a reservoir, or sump, through a filter. The ATF pressure is typically regulated by means of a solenoid-actuated regulator valve. The solenoid actuates a valve member to produce a bias pressure in the main transmission pressure line based on a command voltage received from a control module. In this way, the fluid pressure and flow in the main transmission pressure line are regulated to a desired value. Alternatively, some transmissions employ a less complex mechanical spring biased pressure regulator for the same purpose.

By having the pump driven by a power input of the vehicle's engine, the resulting ATF fluid flow from the pump through the transmission main line is, in both pressure and quantity, proportional, or "linear", with respect to engine speed. Conversely, the transmission generally requires ATF at constant volume and pressure across its operating range. Since conventional transmission pumps are driven by the vehicle engine, the conventional transmission pump and its mechanical drive components are sized so as to meet all possible lubrication, actuation and cooling requirements of the transmission when the engine, and thereby the pump mechanism, is at idle. Thus, whenever the engine speed is elevated above idle, the transmission pump produces a greater volume and pressure of ATF than is required and the supply of ATF is excessive. This excess amount of ATF flow is simply returned to the sump, by the regulator valve, as wasted energy. This wasted energy is an unnecessary mechanical loss that drains power from the engine, reducing transmission and overall vehicle efficiency.

Looking further ahead to new technological advances in automotive design, hybrid vehicles with multiple power sources and multiple power transfer operating modes are emerging. Hybrid vehicle designs can provide both low emissions and improve fuel economy. In order to do this, some hybrid vehicle designs switch drive modes between electrical power and conventional engines in such a manner that the internal combustion engine may be below a standard, or conventional idle speed, or off, at times during vehicle operation. This could occur when there is no forward movement of the vehicle (e.g., at a stoplight), or when the vehicle is coasting, or when driven solely by the electrical power source. This highlights another disadvantage in conventional transmission pump designs; namely, with the internal combustion engine at a below idle condition, there is little, or no, ATF flow. Thereby, there is a need to meet the lubrication, cooling and actuation requirements of the transmission in a hybrid vehicle during these operating conditions.

This drawback to the conventional automatic transmission pump can also be seen in conventional vehicles in one other specific instance. If the engine is off in a conventional vehicle, yet the vehicle's drivetrain is moving, for example where a vehicle is being towed, there is no ATF lubrication being provided to the bearings and gear sets of the transmission. Simply towing the vehicle could cause damage to the internal workings of the transmission itself.

Therefore, specific disadvantages to conventional transmission ATF pump construction and operation exist. The first being the excessive ATF flow delivery for engine speeds at or above idle, which results in a drain to the engine's power resources and second, the inability of conventional designs to adequately supply the transmission with ATF during engine off or below idle conditions. These disadvantages create the need for a transmission pump design that is both more efficient and is able to operate when the vehicle's engine is below idle, off, or otherwise disconnected, but transmission and thereby vehicle operation is required.

SUMMARY OF THE INVENTION AND ADVANTAGES

The present invention overcomes the disadvantages and drawbacks in the related art as a hydraulic transmission pump assembly which includes a pump adapted to provide fluid under pressure to predetermined components in a transmission, a one-way clutch assembly operatively coupled to the pump, and an electric motor operatively coupled to the one-way clutch. The one-way clutch assembly having an operative connection to an engine is adapted to provide motive power from the engine to the pump and to the electric motor at engine speeds above a predetermined level thereby providing fluid under pressure to the transmission and driving the electric motor to generate electricity. The electric motor is also operable to drive the pump, through the one-way clutch, at engine speeds below the predetermined level thereby providing fluid under pressure to the transmission during this operating condition.

The present invention is also directed to a method of providing hydraulic power to an automotive transmission. The method includes the steps of providing a pump which is operatively actuated about a central axis as defined by a power input shaft to the pump, providing an electric motor which is electrically connected to the electrical system of an automobile, and providing a one-way clutch assembly operatively interconnected between the electric motor and the pump. The method also includes the steps of controlling the operation of the one-way clutch such that the one-way clutch causes the pump to be driven by the electric motor when the automotive engine is operating below a predetermined RPM, and controlling the one-way clutch such that it causes both the pump and the electric motor to be driven by the power input shaft when the automotive engine is operating above a predetermined RPM such that the electric motor functions as a generator to provide electric power back to the automobile electrical system during specific times of motor vehicle operation.

The present invention overcomes the deficiencies in the related art by first, providing the required, regulated ATF flow when the vehicle's internal combustion engine is off or below idle speed, and second, by providing the required, regulated ATF flow at above idle speeds while simultaneously recovering excess mechanical energy delivered to the pump from the engine by converting it to electrical energy and sending it back to the electrical system.

BRIEF DESCRIPTION OF THE DRAWINGS

FIG. 2A is a cross-sectional, cut-away view of the one-way clutch employed in the hydraulic transmission pump assembly of the present invention;

FIG. 2B is a cross-section, detail view of the one-way clutch employed in a locked engagement mode;

FIG. 2C is a cross-section, detail view of the one-way clutch employed in a disengaged mode;

FIG. 3 is a cross-section view of a gerotor pump employed in the hydraulic transmission pump of the present invention.

DETAILED DESCRIPTION OF THE PREFERRED EMBODIMENT(S)

Figure 1:
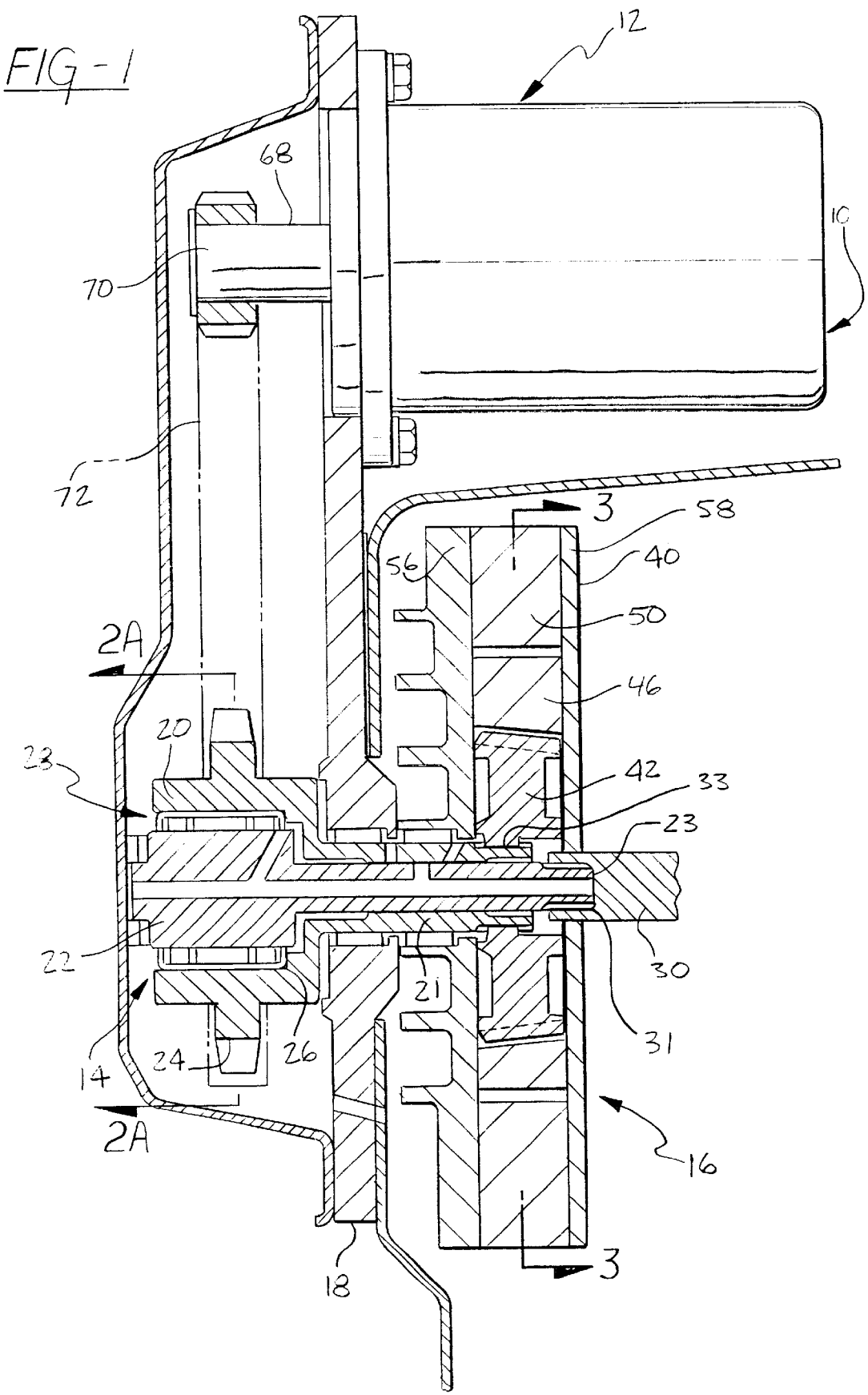
FIG. 1 is a side view of a hydraulic transmission pump assembly of the present invention.

The hydraulic transmission pump assembly of the present invention is generally indicated as 10 in FIG. 1 where like numerals are employed to designate like structure throughout the figures. The hydraulic transmission pump assembly includes an electric motor, generally indicated as 12, a one-way clutch assembly, generally indicated as 14, and a hydraulic pump, generally indicated as 16. The one-way clutch assembly 14 is a roller-type engagement mounted to a support structure 18 and includes an outer race 20 and an inner race 22. Both the outer race 20 and the inner race 22 have extended shafts 21 and 23, respectively. Inner race 22 is disposed within the outer race 20 and the extended shaft 23 of the inner race 22 fits within and passes through the extended shaft 21 of outer race 20. The extended shaft 23 of inner race 22 is splined at 31 to a power input 30 that is ultimately driven by a prime mover, such as the vehicle's engine. The extended shaft 21 of outer race 20 is splined at 33 to the inner pumping gear element 42 of transmission pump 16, described in greater detail below. The outer race 20 additionally has a plurality of sprocket gear teeth 24 disposed about its outer circumference.

The inner race 22 of the one-way clutch 14 is disposed within the outer race 20 in such a manner as to provide a circumferential clearance space 26 between the two races 20 and 22. Operatively disposed within the clearance space 26 is the one-way engagement assembly, generally indicated at 28, in FIGS. 1 and 2A. As best shown in the detailed views of FIGS. 2B and 2C, the one-way engagement 28 is a combination of a plurality of rollers 32 with accompanying springs 34 and spring retainers 36, and machined grooves along the inner diameter of the outer race 20 that constitute narrowed, or cammed, portions 38. In the detailed views, FIG. 2B shows the manner in which the "roller spring-type" one-way clutch 14 operates. If either race is made to rotate in the manner in which the rotational movement between the races results in a clock-wise rotation of the inner race 22 relative to the outer race 20 (as depicted in FIG. 2B), a locking event occurs. Normally, the springs 34 and their retainers 36 bias the rollers 32 close to the narrowing cam portions 38 of the circumferential clearance space 26. Then, as a relative locking rotation of the races takes place (FIG. 2B), the rollers 32 roll slightly and are forced into a tight fit between the races 32 and 34 at the cam portions 38 of the clearance space 26, which causes a physical engagement between the races 20 and 22. It should be appreciated by those having ordinary skill in the art, that while FIGS. 2A, 2B, and 2C depict narrowing cam portions 38 located on the inner diameter surface of outer race 20, this is non-limiting by way of example and that the cam portions 38 could also be located on the inner race 22 or both races 20 and 22.

In contrast, when a relative rotational movement occurs between the races 20 and 22 such that inner race 22 rotates in a non-locking or unlocking direction (shown as counter-clockwise in FIG. 2C), then the rollers are forced out of the cam portions 38 of the clearance space 26. The rollers 32 roll slightly back against the springs 34, slightly collapsing them and allowing the races 20 and 22 to become, or remain, unlocked and freewheel relative to each other. When the relative freewheeling rotation stops, the springs 34 expand out, re-biasing the rollers 32 lightly back against the cam portions 38 of the clearance space 26.

The transmission pump, generally indicated at 16, is mounted to support member 18 and includes a pump body 40. As shown in FIG. 1, the pump 16 mounts in such a manner that pump body 40 and one-way clutch assembly 14 are brought into alignment and cooperative interconnection through support member 18 along longitudinal axis "A" when these portions of the present invention are assembled. In the preferred embodiment, the transmission pump 16 is gerotor type pump having a gear set comprised of a first or inner pumping gear element 42 having external teeth 44 and a second or outer pumping gear element 46 having internal teeth 48.

The pump body 40 includes a pump bore member 50 and pump end members 56 and 58. The outer surface of the outer gear pumping element 46 is smooth finished and is disposed within bore opening 45 of pump bore member 50 in a close-tolerance, but rotatable fit. The number of external teeth 44 in the inner gear pumping element 42 is one less than the number of teeth 48 in the outer gear pumping element 46. The inner gear pumping element 42 is disposed within the outer gear pumping element 46 in such a manner that all the teeth 44 and 48 are in some form of continuous contact, from fully engaged to almost disengaged.

As best shown in FIG. 3, outer gear pumping element 46 is disposed within the pump bore member 50 on a radial axis "B". The inner gear pumping element 42 is disposed within the outer gear element inline with central axis "A". Radial axis "B" is eccentric to the central axis "A" and thereby outer gear pumping element 46 is offset relative to the radial axis of the inner gear pumping element 42. The bore opening 45 of pump bore member 50 is centered on axis "B" which accommodates the offset axial displacement of the outer gear pumping element 46. In this manner, as the inner gear member 42 rotates about axis "A", it drives outer gear pumping element 46 in the bore opening 45, such that the meshing of the teeth 44 and 48 creates spaces between the gear teeth that define pumping chambers 52 and 54, which expand and contract respectively as the elements rotate. As further shown in FIG. 2, as the gear elements rotate, their teeth pass through a line shown as "C-D". Line C-D is drawn through the axes "A" and "B" and indicates the radial points in the rotation of the gear members 42 and 46 at which the teeth 44 and 48 are at their most open and most fully engaged, respectively. In other words, the spaces between the teeth transition from expanding chambers 52 to contracting chambers 54, and vice versa, as the teeth of the gear set pass through the respective "C" and "D" radial points of their rotation. Within pump bore member 50 and pump end member 36, an inlet passage 64 and an inlet port 66 are machined, in a known manner, through to an area that meets the meshing teeth at a point in their rotation where they form expanding chambers 52. The pump bore member 50 and the pump end member 36 further have an outlet passage 60 and outlet port 62 also machined, in a known manner, through to an area that meets the meshing teeth where they are forming contracting chambers 54. It should be appreciated by those with ordinary skill in the art that inlet port 66 and outlet port 62 are, by some known manner, in fluid connection with ATF lines (not shown), which would allow distribution and delivery of ATF throughout the transmission as required.

As shown in FIG. 1, the electric motor, generally indicated at 12, is mounted on the pump support member 18 in a relative position to allow it to be aligned with the pump 16 and one-way clutch 14 in parallel to axis "A". The output shaft 68 of electric motor 12 has a sprocket gear 70 disposed upon its end so that it may be operatively interconnected by a roller link chain 72 to the sprocket gear teeth 24 disposed about the outer diameter of the outer race 20 of the one-way clutch 14. In the preferred embodiment, as illustrated in the figures, the output shaft 68 of the electric motor 12 and the one-way clutch 14 are operatively connected via a roller link chain 24 that is entrained about the sprocket gear 70 and the sprocket gear teeth 24. The electric motor 12 is thereby operatively interconnected to the pump 16 through the sprocket 24, roller chain 72, sprocket teeth 24 of the outer race 20, and the splined connection 33 of the extended shaft 21 of the one-way clutch assembly 14 to the inner gear pumping element 42 of the pump 16. It should be appreciated that any variety of interconnection methods may be used to allow torque translation between the one-way clutch 14 and the electric motor 12, and the disclosed roller link chain 72 of the preferred embodiment merely serves as an example of such.

In the preferred embodiment, two operational modes exist. The first operational mode is contemplated when a flow of ATF for operation of the transmission is required yet the vehicle's engine is off or at a below idle condition where an insufficient supply of ATF is available through the mechanical connection to the power input from the engine. In this first mode, with the vehicle engine off or at below idle, a line pressure regulator signals an electronic vehicle control system that ATF flow is below a required threshold. The vehicle control system, or a line pressure regulator then energizes the electric motor 12. The electric motor 12 spins its output shaft 68, which, through its interconnection to the inner gear pumping element 42 of the pump 16 through sprocket 70, roller chain 72, sprocket teeth 24 of the outer race 20, and the splined connection 31 of the extended shaft 21 of the one-way clutch assembly 14, drives the pump 16 to produce a pressurized ATF flow.

This occurs as the inner gear pumping element 42 rotates, driving the outer gear pumping element 46. ATF, which is supplied to the inlet port 66 and inlet passage 64 of the pump 16, flows into the open expanding chambers 52 between the gear teeth 44 and 48. The expanding chambers 52 pass the ATF, by their rotation in the pump body 40, past axial point "C" to the point where the teeth begin to mesh together. The gear teeth 44 and 48 then displace the ATF into the outlet passage 60 and outlet port 62 as they rotate toward axial point "D" and mesh closer, contracting the chambers 54, thereby creating a positive pressure and pumping the ATF out. A line pressure regulator (not shown) will provide an input to the vehicle control system to regulate the operation of the electric motor 12 and thereby control the ATF pressure to the transmission.

In one non-limiting embodiment, the system may be configured to switch the electric motor 12 simply on and off in response to sensed ATF delivery. In another non-limiting embodiment the electric motor 12 may be driven at variable speeds, rather than on or off, to control ATF delivery. It should be appreciated that in this operational mode, when the vehicle engine is off or at below idle speeds, and the output shaft 22 of the electric motor 12 causes the outer race 20 and the inner gear pumping element 42 of the pump 16 to spin that, by the nature of the one-way clutch assembly 14, the outer race 20 rotates in freewheel about the inner race 22 without imparting any force on the vehicle engine power input 30.

The second operating mode is contemplated when a flow of ATF for operation of the transmission is required and the vehicle's engine is running at or above an idle condition. With the engine running at or above idle, the extended shaft 23 of inner race 22 and thereby the outer race 20 and its extended shaft 21, through the one-way clutch engagement 28 will be driven by the operatively connected power input 30 from the vehicle engine. In this second mode, two functional operations occur simultaneously. Primarily, the torque input from the vehicle engine, through the one-way clutch assembly, causes the transmission pump to rotate. Specifically, as shown in FIG. 1, the extended shaft 21 of the outer race 20 is operatively coupled to the inner gear pumping element 42 of the transmission pump 16, so that the rotation imparted to the outer race 20 through the one-way clutch engagement 28 drives the transmission pump 16 thereby providing a pressurized volume of ATF to the transmission. As discussed previously, pump operation through the vehicle's engine input will flow excessive amounts of ATF above the idle level, so that a line pressure regulator, or regulator valve, elsewhere in the vehicle transmission, will route the excess flow back to the sump.

Secondarily, as described generally above, the torque input from the vehicle engine turns the inner race 22 by its extended shaft 23, which causes the one-way clutch 14 to engage thereby also rotating the outer race 20. The outer race 20, as shown in FIG. 1, is operatively connected to the electric motor 12 through the sprocket teeth 24 of the outer race 20, the roller link chain 72, and the sprocket gear 70. This imparts rotation to the output shaft 68 of the electric motor 12.

It should be appreciated by those having ordinary skill in the art, that when the electric motor 12 is off (i.e., the windings of the motor are non-energized) and the shaft 68 of the motor is mechanically rotated, that the motor 12 then electrically functions as a generator. This occurs due to the inverse nature of electric motors, in which, as the wound magnetic armature on the shaft of an electric motor is turned, a magnetic field is set up within the motor's field windings, which produces, or generates, an electrical current. In this manner, at vehicle engine idle and above, the electric motor 12 of the present invention functions as a generator, creating electrical current from the mechanical energy imparted to its shaft 68 from the vehicle's engine through the one-way clutch assembly 14. This generated electrical current is fed back to the vehicle electrical system to either charge the battery or assist in operating other electrically actuated components associated with the vehicle.

The present invention is also directed to a method of providing hydraulic power to an automotive transmission. The method includes the steps of providing a pump 16 which is operatively actuated about a central axis as defined by a power input shaft 30 to the pump 16, providing an electric motor 12 which is electrically connected to the electrical system of an automobile, and providing a one-way clutch assembly 14 operatively interconnected between the electric motor 12 and the pump 16. The method also includes the steps of controlling the operation of the one-way clutch 14 such that the one-way clutch 14 causes the pump 16 to be driven by the electric motor 12 when the automotive engine is operating below a predetermined RPM, and controlling the one-way clutch 14 such that it causes both the pump 16 and the electric motor 12 to be driven by the power input shaft 30 when the automotive engine is operating above a predetermined RPM such that the electric motor 12 functions as a generator to provide electric power back to the automobile electrical system during specific times of motor vehicle operation.

Therefore, in summary, the preferred invention provides two operational modes. The first mode utilizes the electric motor 12, through the one-way clutch assembly 14, to drive the transmission pump 16, which provides regulated ATF flow to the transmission, when the vehicle's engine is off or in a below idle condition. The second mode, utilizes a power input 30 from the vehicle's engine, through the one-way clutch assembly 14, to drive the transmission pump 16, which provides ATF flow to the transmission, when the vehicle's engine is at or above idle condition. Concurrently in the second mode, the one-way clutch assembly 14 allows the excess mechanical power from the engine to be converted into useable electrical energy by diverting the excess mechanical energy to the electric motor 12.

Accordingly, the present invention is a method and an apparatus for providing a hydraulic transmission pump assembly having a one-way clutch, which overcomes the drawbacks of conventional designs that cannot provide proper ATF flow to the transmission when the engine is off or below idle speed. Additionally, the present invention is more efficient than the prior art as it provides the required, regulated ATF flow anytime the engine is at idle or above, while concurrently converting any excess applied engine power into usable electrical energy that is fed back to the vehicle electrical system. Furthermore, these objectives are achieved with the method and apparatus of the present invention in an efficient, cost effective and relatively simple manner.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A hydraulic transmission pump assembly comprising:
   a pump adapted to provide fluid under pressure to predetermined components in a transmission;
   a one-way clutch assembly operatively coupled to said pump; and
   an electric motor operatively coupled to said one-way clutch assembly, said one-way clutch assembly having an operative connection to an engine adapted to provide motive power from the engine to said pump and to said electric motor at engine speeds above a predetermined level thereby providing fluid under pressure to the transmission and driving said electric motor to generate electricity, said electric motor operable to drive said pump, but not engine, through said one-way clutch, at engine speeds below said predetermined level thereby providing fluid under pressure to the transmission during this operating condition.

2. A hydraulic transmission pump assembly as set forth in claim 1 wherein said pump is a gerotor type pump having an inner pumping gear element including external teeth and an outer pumping gear element having internal teeth wherein the number of external teeth of said inner pumping gear element in one less than the number of said internal teeth of said outer pumping gear element such that said external gear teeth of said inner pumping gear element mesh with said internal teeth of said outer pumping gear element to provide a pumping action therebetween thereby providing fluid under pressure to the transmission.

3. A hydraulic transmission pump assembly as set forth in claim 2 wherein said inner pumping gear element is operatively disposed on a driven shaft defining a central pump axis, said outer pumping gear element defining an axis which is offset relative to said central pump axis so that said internal and external teeth of said inner pumping gear element and said outer pumping gear element respectively define pumping chambers that expand and contract as said gear elements rotate relative to one another.

4. A hydraulic transmission pump assembly as set forth in claim 3 wherein said pump further comprises a pump body having an inlet and an outlet port adapted to take in a fluid media at a first lower pressure through said inlet port and delivering the fluid media through said outlet port at a second higher pressure.

5. A hydraulic transmission pump assembly as set forth in claim 4 wherein said pump body comprises an inlet passage in fluid connection to said inlet port and an outlet passage in fluid connection to said outlet port such that said inlet passage delivers fluid media at said first lower pressure to said expanding pumping chambers and said outlet passage receives fluid media at said second higher pressure from said contracting pumping chambers.

6. A hydraulic transmission pump assembly as set forth in claim 5 wherein said one-way clutch assembly includes an inner race having an extended shaft operatively coupled to an engine and an outer race having an extended shaft operatively connected to said pump, said outer race further having an outer sprocket operatively coupled to said electric motor.

7. A hydraulic transmission pump assembly as set forth in claim 6 wherein said one-way clutch assembly further includes a one-way clutch engagement assembly operatively disposed between said inner and outer races adapted to operatively interconnect said races in one rotational direction and operatively allow free relative movement of the races in the opposite rotational direction.

8. A hydraulic transmission pump assembly as set forth in claim 7 wherein said one-way clutch engagement assembly is further comprised of a circumferential clearance space between said inner and outer races having a plurality of narrowing cam portions, and a plurality of rollers operatively disposed in said clearance space parallel to the central axis of said races such that when either said race is rotated in a locking direction relative to the other said race, said plurality of rollers are wedged in said plurality of narrowing cam portions as to operatively form a physical engagement between said inner and outer rollers.

9. A hydraulic transmission pump assembly as set forth in claim 8 wherein said clutch engagement assembly further includes a plurality of springs and retainers operatively disposed in said circumferential clearance space between said inner and outer races interposed cooperatively with said rollers such that said springs operatively expand and bias said rollers into said narrowing cam portions of said clearance space when either said race is rotated in the locking direction relative to the other said race, said springs further operatively compress allowing said rollers to retract from of said narrowing cam portions of said clearance space such that said inner and outer races are operatively disengaged when either said race is rotated in the non-locking direction relative to the other said race.

10. A hydraulic transmission pump assembly as set forth in claim 9 wherein said electric motor has a sprocket gear operatively disposed on its output shaft.

11. A hydraulic transmission pump assembly as set forth in claim 10 wherein said sprocket of said electric motor is operatively connected by a roller link chain to said outer sprocket of said one-way clutch such that outer race of said one-way clutch may be driven by said electric motor or said outer race may drive said electric motor.

12. A hydraulic transmission pump assembly comprising:
a one-way clutch assembly adapted to accept and transfer rotational power from both an engine of a motor vehicle and an electrical motor;
a gerotor pump adapted to accept rotational power from said one-way clutch and provide a volume of pressurized hydraulic fluid to a transmission of a motor vehicle; and
a said electric motor adapted to provide rotational power to said one-way clutch.

13. A hydraulic transmission pump assembly as set forth in claim 9 wherein said electric motor has a sprocket gear operatively disposed on its output shaft.

14. A hydraulic transmission pump assembly as set forth in claim 13 wherein said one-way clutch assembly includes an outer race having both an extended shaft and an outer sprocket, and an inner race having an extended shaft adapted to pass through said extended shaft of said outer race.

15. A hydraulic transmission pump assembly as set forth in claim 14 wherein said extended shaft of said inner race of said one-way clutch assembly is operatively coupled to the engine.

16. A hydraulic transmission pump assembly as set forth in claim 15 wherein said gerotor pump is operatively connected to said extended shaft of said outer race and said electric motor is operatively connected to said outer sprocket of said outer race.

17. A hydraulic transmission pump assembly as set forth in claim 16 wherein said gerotor pump includes a gear set having an inner pumping gear element and an outer pumping gear element.

18. A hydraulic transmission pump assembly as set forth in claim 17 wherein said gerotor pump further includes an inner pumping gear element having external teeth interposed in meshing relationship an outer pumping gear element having internal teeth, said inner pumping gear element operatively disposed on a central pump axis defined by said common central shaft, said outer pumping gear element operatively disposed on an axis that is offset relative to said central pump axis so that rotation of said inner and outer pumping gear elements, relative to one another, creates gaps between said internal and external teeth which define expanding and contracting pumping chambers.

19. A hydraulic transmission pump assembly as set forth in claim 18 wherein said pump further comprises a pump body having an inlet passage operatively connected to an inlet port and an outlet passage operatively connected to an outlet port such that said inlet passage delivers fluid media at said first lower pressure to said expanding pumping chambers and said outlet passage receives fluid media at said second higher pressure from said contracting pumping chambers.

20. A method of providing hydraulic power to an automotive transmission, the method comprising the steps of:
providing a pump which is operatively actuated about a central axis as defined by a power input shaft to the pump;
providing an electric motor which is electrically connected to the electrical system of an automobile;
providing a one-way clutch assembly operatively interconnected between the electric motor and the pump; and controlling the operation of the one-way clutch such that the one-way clutch causes the pump to be driven by the electric motor when the automotive engine is operating below a predetermined RPM and that the one-way clutch causes both the pump and the electric motor to be driven by the power input shaft when the automotive engine is operating above a predetermined RPM such that the electric motor functions as a generator to provide electric power back to the automobile electrical system during specific times of motor vehicle operation.

* * * * *